Sept. 28, 1926.

F. A. MILLET 1,601,367

FOOD CURING MACHINE

Filed March 2, 1926    2 Sheets-Sheet 2

Inventor

F. A. Millet

By Mason Fenwick Lawrence,
Attorneys

Patented Sept. 28, 1926.

1,601,367

UNITED STATES PATENT OFFICE.

FRANK A. MILLET, OF WESTWEGO, LOUISIANA.

FOOD-CURING MACHINE.

Application filed March 2, 1926. Serial No. 91,791.

This invention relates to improvements in food drying and curing machines, particularly in improved means for housing the machine and properly supplying the housing with heat and smoke for curing purposes.

A further object of this invention is to provide improved carrying means for the food while in the process of being cured.

A further object of this invention is to provide a curing machine adapted to cure various foods by drying or smoking such as fruit, vegetables, meat, shrimp, oysters, fish foods and the like.

A prime object of this invention being to provide improved food carrying elements within the housing consisting of screens suitably supported on a shaft, specially designed screens being adapted for the drying of shell fish, and specially designed means included within the same housing for the purpose of drying and otherwise curing such foods as meats, vegetables, fruit and the like.

Another object of this invention is to provide a source of heat and smoke for curing purposes suitably separated from the food containing chamber, having regulating means for properly supplying heat and smoke to the food.

Another object of this invention is to provide efficient means for revolving the shaft upon which the food carrying elements consisting of screens or otherwise are adapted to be supported.

Further objects of this invention will appear from the disclosure in the following detailed description of the device and in the disclosures as set forth in the two sheets of drawings which are herewith made a part of this application.

Figure 1:
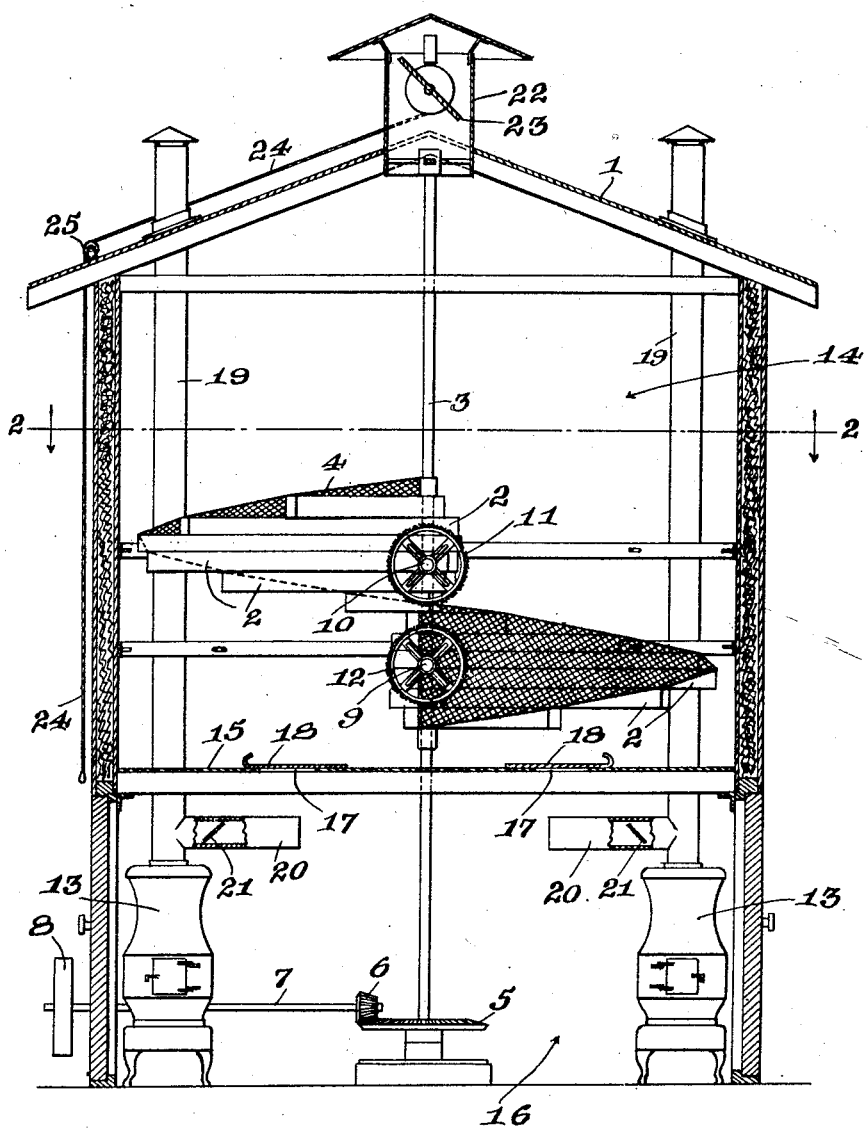
Fig. 1 represents a vertical elevational view of the food curing apparatus in assembled form with portions broken away in order to more clearly define various details of construction.

Numeral 1 designates a housing adapted for the purpose of sheltering a food carrying machine consisting of supporting arms 2, suitably connected to a shaft 3, the arms 2 being adapted to receive screen portions 4. The arms 2, are preferably attached to the shaft 3 in such a manner as to extend radially therefrom, the screen portion 4 being placed upon these supports in such a manner as to extend spirally around the shaft 3, thereby forming a comparatively flat surface upon which to place suitable food products for curing purposes. A supporting shaft 3 is adapted to be revolved by means of a suitable friction or gear wheel 5 connected thereto, and driven by means of a driving gear 6, shaft 7, and driving pulley 8, the driving pulley 8 being attached to some suitable source of power.

Extending radially from the shaft 3, are other supporting arms 9 and 10 adapted to support circular screen portions 11 and 12, these circular food carrying elements or screens 11 and 12 are particularly intended for the drying and curing of shrimp or the like, and are arranged to revolve on their supporting arms 10 and 9 in addition to being carried around on the revolving of the shaft 3.

Means for properly supplying the housing 1 with heat and smoke for curing purposes may be provided in any suitable manner such as by heating stoves 13 adapted to be properly located within the housing 1 and separated from the food curing chamber 14, by means of a partition 15, which may be made of any suitable material such as galvanized iron plate. This partition acts to entirely separate the food curing chamber 14 from the heating chamber 16, and is supplied with openings 17, adapted to be closed or opened by means of regulating dampers 18, thereby making it possible to regulate the amount of heat to be received from the stoves 13 for purposes of curing.

The flues 19 from the heating elements 13 may extend in any suitable manner to the roof of the housing 1 or otherwise.

In order to supply smoke for the purpose of curing the food in that manner, an extension 20 may be made from the flues in the heating chamber 16, the extension 20 consisting of a smoke pipe having suitable dampers 21 therein for regulating the desired amount of smoke from the heating units 13 for the purpose of smoking meats and the like in the food chamber 14, the amount of smoke received in the chamber 14, being controlled by the dampers 18 in the partition 15.

The housing 1 may be constructed of suitable walls filled with asbestos for insulation purposes and lined with galvanized iron. A ventilating device is adapted to be placed at the top of the housing 1 as at 22 and to include a damper 23 arranged to be regulated by means of chain or cable 24 and pulley 25.

In operation, this invention provides a food curing apparatus comprising a housing, food curing elements within the housing, means for properly supplying the housing with heat and smoke for curing purposes, the food supporting elements consisting of screens suitably supported upon a shaft which is adapted to be revolved.

The machine may be built partly in wood or partly in metal or all of metal if so desired. The apparatus may be heated and operated by means of steam, gas, oil, electricity or by wood as it may suit the operator. For the farmer, wood would be preferable as he has usually neither gas, coal or electricity.

Figure 2:
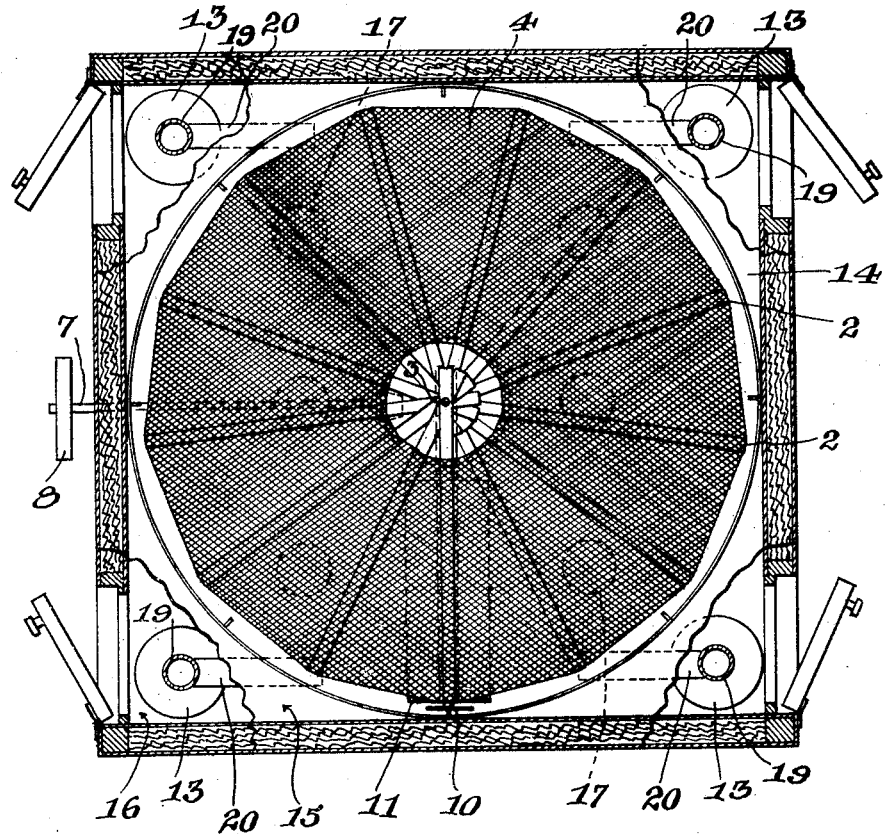
Fig. 2 illustrates a plan view of the food curing apparatus taken on line 2—2 of Fig. 1.

The machine is simple in operation, the friction wheel 5 driving the main shaft 3, the main shaft holding the arms supporting the screens as clearly disclosed in the Figs. 1 and 2 of the drawings the dampers 21 of the smoke supplying pipes 20 are adapted to regulate the use of this machine for the purposes of smoking, or curing meat when desired. It may be found preferable to use the round screens for drying shrimp, and the flat screens for vegetables and the like, the round screens being arranged to revolve on their shaft and also with the main shaft 3.

The upper damper 23 of the ventilator 22 may be utilized to regulate the heat and evaporate the food which is being cured. It is to be understood that the utility of this invention and various modifications thereof, is limited only by the scope of the specification and claims as set forth herewith.

What I claim is:

1. A food curing apparatus comprising a housing, food carrying elements within the housing, means for supplying the housing with heat and smoke for curing purposes, the food supporting elements consisting of screens supported upon a shaft, the screen supporting means consisting of radially extending arms, one end of the arms being attached to the shaft, the arms being arranged radially about the shaft in such a manner as to support the screen spirally around the shaft, the source and the curing means being separated from the food by a partition, openings in the partition being fitted with suitable device regulating the amount of heat or smoke to be admitted to the food, means for revolving the food supports consisting of a friction wheel on the shaft and a source of power for driving the wheel.

2. A food curing apparatus comprising a housing, food carrying elements within the housing, means for supplying the housing with heat and smoke for curing purposes, the food supporting elements consisting of screens supported upon a shaft, the screen supporting means consisting of radially extending arms, one end of the arms being attached to the shaft, the arms being arranged radially about the shaft in such a manner as to support the screen spirally around the shaft.

In testimony whereof I affix my signature.

FRANK A. MILLET.